US011139482B2

(12) United States Patent
Sharman et al.

(10) Patent No.: US 11,139,482 B2
(45) Date of Patent: Oct. 5, 2021

(54) CATALYST

(71) Applicant: JOHNSON MATTHEY FUEL CELLS LIMITED, London (GB)

(72) Inventors: Jonathan David Brereton Sharman, Reading (GB); Alejandro Martinez Bonastre, Reading (GB); Geoffrey Spikes, Reading (GB)

(73) Assignee: Johnson Matthey Fuel Cells Limited, London (GB)

( * ) Notice: Subject to any disclaimer, the term of this patent is extended or adjusted under 35 U.S.C. 154(b) by 299 days.

(21) Appl. No.: 16/303,912

(22) PCT Filed: May 25, 2017

(86) PCT No.: PCT/GB2017/051476
§ 371 (c)(1),
(2) Date: Nov. 21, 2018

(87) PCT Pub. No.: WO2017/203257
PCT Pub. Date: Nov. 30, 2017

(65) Prior Publication Data
US 2020/0321622 A1    Oct. 8, 2020

(30) Foreign Application Priority Data

May 25, 2016 (GB) ..................... 1609151

(51) Int. Cl.
*H01M 8/04* (2016.01)
*H01M 4/86* (2006.01)
(Continued)

(52) U.S. Cl.
CPC ....... *H01M 4/8652* (2013.01); *H01M 4/8828* (2013.01); *H01M 4/921* (2013.01);
(Continued)

(58) Field of Classification Search
CPC ...................................................... H01M 8/04
See application file for complete search history.

(56) References Cited

U.S. PATENT DOCUMENTS 8,372,562 B2    2/2013  Tabata et al.
8,557,470 B2 *  10/2013 Terazono ............ H01M 4/8828
                                                    429/487
(Continued)

FOREIGN PATENT DOCUMENTS

CN    104203480 A    12/2014
EP      0631337 A2   12/1994
(Continued)

OTHER PUBLICATIONS

Group I could be made by codepositing the two alloys. In addition, the special technical feature of a first catalyst, a second catalyst, and a support is taught by Wang et al. (PT Decorating PdNi/C as electrocatalysts for oxygen reduction Electrochimica vol. 44, No. 5, 2010).*

(Continued)

*Primary Examiner* — Jacob B Marks
(74) *Attorney, Agent, or Firm* — BakerHostetler

(57) ABSTRACT

An electrocatalyst material comprising: (i) a support material comprising a plurality of individual support particles or aggregates; (ii) first particles comprising a first metal and an alloying metal; and (iii) second particles consisting of a second metal or a second metal oxide, wherein the second metal is platinum or iridium; wherein each individual support particle or aggregate has dispersed thereon first particles and second particles, characterised in that the mean average particle size of the second particles is smaller than the mean average particle size of the first particles is disclosed. The (Continued)

electrocatalyst material has particular use in an electrode, such as the cathode, of an electrochemical cell, such as a fuel cell.

20 Claims, 4 Drawing Sheets

(51) Int. Cl.
  *H01M 4/88* (2006.01)
  *H01M 4/92* (2006.01)
  *H01M 8/1018* (2016.01)

(52) U.S. Cl.
  CPC ........... *H01M 4/923* (2013.01); *H01M 4/926* (2013.01); *H01M 8/1018* (2013.01)

(56) References Cited

U.S. PATENT DOCUMENTS

| | | |
|---|---|---|
| 2009/0023032 A1 | 1/2009 | Obata |
| 2011/0177425 A1 | 7/2011 | Yoo et al. |
| 2013/0022891 A1 | 1/2013 | Chuy et al. |
| 2018/0280878 A1 | 10/2018 | Inoda et al. |

FOREIGN PATENT DOCUMENTS

| | | |
|---|---|---|
| EP | 2019445 A2 | 1/2009 |
| JP | 2003092114 A | 3/2003 |
| JP | 2006079840 A | 3/2006 |
| JP | 2009152143 A | 7/2009 |
| JP | 2015190018 A | 11/2015 |
| KR | 20130096527 A | 8/2013 |
| WO | 2000/024074 A1 | 4/2000 |
| WO | 2005/123255 A1 | 12/2005 |
| WO | 2007116924 A1 | 10/2007 |
| WO | 2012/080726 A1 | 6/2012 |
| WO | 2013/045894 A1 | 4/2013 |
| WO | 2013144631 A1 | 10/2013 |
| WO | 2014/105407 A1 | 7/2014 |
| WO | 2014/184546 A1 | 11/2014 |
| WO | 2015/145128 A1 | 10/2015 |
| WO | WO2017051894 A1 | 3/2017 |

OTHER PUBLICATIONS

Grestzler et al., "The Impact of Platinum Loading on Oxygen Transport Resistance," Journal of the Electrochemical Society, vol. 159, Issue 12, 2012, F831-F840.

Wang, R. et al., "Pt decorating of pdNi/C as electrocatalysts for oxygen reduction," Electrochimica Acta, Elsevier Science Publishers, vol. 55, No. 5, Feb. 1, 2010, pp. 1519-1522.

PCT/GB2017/051478, international Search Report dated Jul. 19, 201 7.

PCT/GB2017/051476, IWritten Opinion dated Jul. 19, 2017.

* cited by examiner

First particles
Second particles

Figure 3. Performance comparison under $H_2$/Air under fully wet conditions, 100% RH, for the examples described in tables 1 and 2.
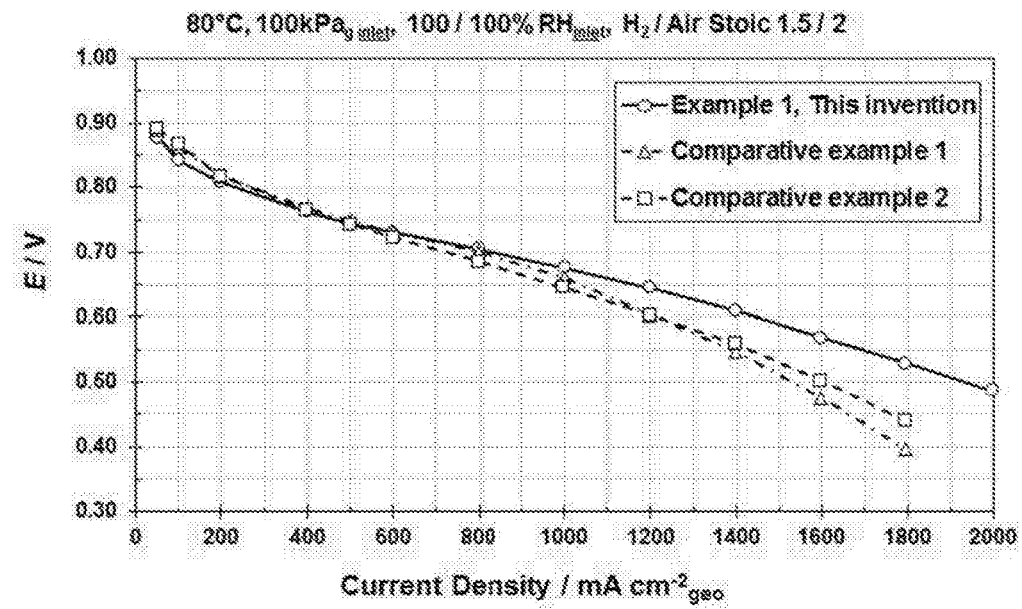
Figure 4. Performance comparison under $H_2$/Air under drier conditions, 30% RH, for the examples described in tables 1 and 2.
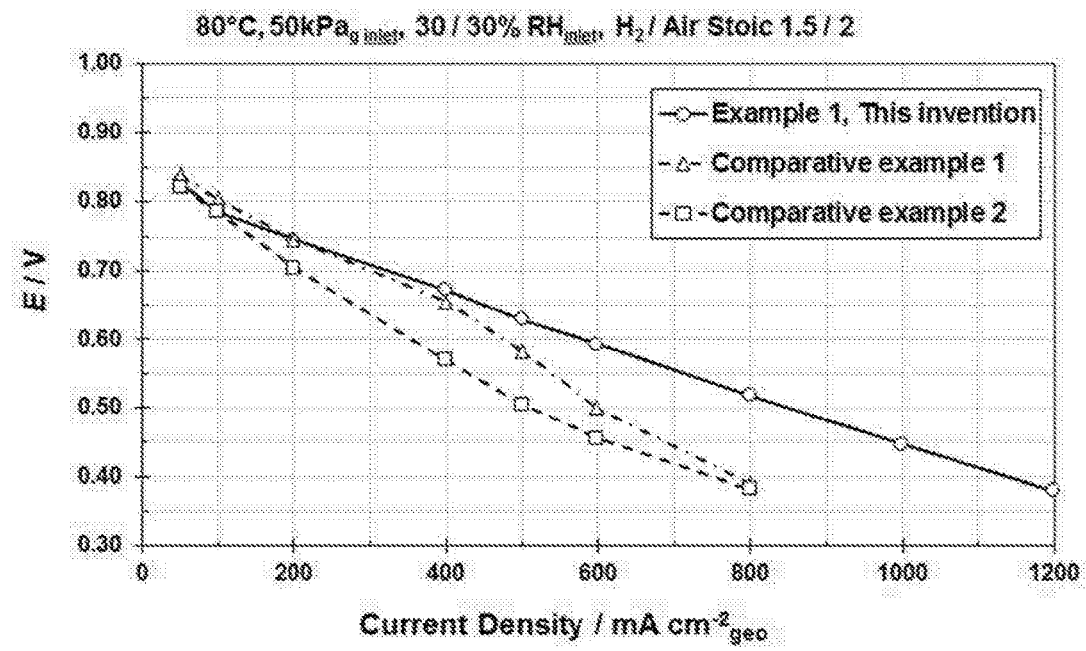

CATALYST

CROSS-REFERENCE TO RELATED APPLICATIONS

This application is the National Stage of International Patent Application No. PCT/GB2017/051476 filed May 25, 2017, which claims priority from Great Britain Patent Application No. 1609151.4, filed May 25, 2016, the disclosures of each of which are incorporated herein by reference in their entireties for any and all purposes.

FIELD OF THE INVENTION

The present invention relates to a new electrocatalyst and in particular an electrocatalyst for use at the cathode of a fuel cell to facilitate the oxygen reduction reaction.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

Conventionally, the MEA can be constructed by a number of methods outlined hereinafter:

(i) The electrocatalyst layer may be applied to the gas diffusion layer to form a gas diffusion electrode. A gas diffusion electrode is placed on each side of the ion-conducting membrane and laminated together to form the five-layer MEA;

(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically, tens or hundreds of MEAs are required to provide enough power for most applications, so multiple MEAs are assembled to make up a fuel cell stack. Flow field plates are used to separate the MEAs. The plates perform several functions: supplying the reactants to the MEAs; removing products; providing electrical connections; and providing physical support.

Electrocatalysts for fuel oxidation and oxygen reduction reactions are typically based on platinum or platinum alloyed with one or more metals. The platinum or platinum alloy catalyst can be in the form of unsupported nanometre sized particles (for example metal blacks) or can be deposited as discrete very high surface area nanoparticles onto a support material (a supported catalyst). Electrocatalysts can also be in the form of coatings or extended films deposited onto a support material. There is a continual search for catalysts, particularly oxygen reduction reaction catalysts, that have improved activity and/or stability, and that therefore utilise the expensive platinum catalyst more effectively. This enables the MEA performance to be increased or the loading (and therefore cost) of the catalyst employed in the MEA to be decreased, or a combination of both benefits.

A wide range of catalyst concepts have been investigated over the past 15 years for improved oxygen reduction activity. Alloying Pt with base metals such as Co, Ni, Cu, Cr and Ti has been shown to increase the surface specific activity of the active Pt catalyst sites, due to either a change in the Pt—Pt inter-atomic distance or to lattice strain causing a shift in the d-band position. However, although such metal alloy catalysts, when formed into MEAs, demonstrate improved cell voltage performance compared to conventional platinum-only catalysts at low current densities, the performance at high current densities is invariably poorer compared to the platinum-only catalysts and is therefore not sufficient for commercial application.

Fuel cell performance at high current density, in particular under practical operation with hydrogen and air reactants ($H_2$/air), can be limited by a number of factors, such as proton conductivity, layer structure or catalyst surface area among others. In recent publications, it has been discussed that when the Pt loading in cathode catalyst layers is reduced below 0.15 mgPt/cm$^2$ additional loses are observed and these are difficult to predict (Grestzler et al, J. Electrochem. Soc. 2012 volume 159, issue 12, F831-F840). Grestzler et al attributed the additional loses under $H_2$/air and at high current density for low loaded cathode layers to an oxygen transport resistance effect. This resistance can be related to the roughness factor of the cathode catalyst layer. The roughness factor is calculated as the product of Pt loading (mgPt/cm$^2$ of the geometric electrode area) and the Pt mass specific electrochemical surface area of the catalyst (m$^2$Pt/gPt). Such effects are exacerbated with Pt alloy catalysts which, due to the thermal annealing process employed to form the alloying interaction, have a larger nanoparticle size than conventional platinum-only catalysts, and thus a lower mass specific surface area and therefore a lower roughness factor at the same Pt loading per cm$^2$ of the electrode. This causes lower performance at high current densities, despite the intrinsically higher kinetic activity afforded by the Pt alloy catalyst materials.

US2013/0022891 attempts to overcome this problem by using a bilayer cathode construction, in which a noble metal/non-noble metal alloy layer is located adjacent to the cathode gas diffusion layer and a noble metal layer is located adjacent to the membrane electrolyte.

WO2014/105407 also attempts to address this problem by providing a Pt—Co/C catalyst and mixing it with a separate Pt/C catalyst in a single layer.

SUMMARY OF THE INVENTION

It is therefore the object of the present invention to provide an electrocatalyst which, when used at the cathode of a fuel cell, provides a benefit in fuel cell performance, when operated under a range of conditions, including $H_2$/air, at low and high current densities, at different humidity and pressure operating conditions, and particularly at lower platinum group metal loadings on the cathode.

Thus, a first aspect of the invention provides an electrocatalyst material comprising:
(i) a support material comprising a plurality of individual support particles or aggregates;
(ii) first particles comprising a first metal and an alloying metal; and
(iii) second particles consisting of a second metal or a second metal oxide, wherein the second metal is platinum or iridium;
wherein each individual support particle or aggregate has dispersed thereon first particles and second particles, characterised in that the mean average particle size of the second particles is smaller than the mean average particle size of the first particles.

BRIEF DESCRIPTION OF THE DRAWINGS

FIG. 3 is a plot showing voltage vs current density of MEAs comprising a catalyst of Example 1 and Comparative Examples 1 and 2 under $H_2$/air and fully humidified conditions.

FIG. 4 is a plot showing voltage vs current density of MEAs comprising a catalyst of Example 1 and Comparative Examples 1 and 2 under $H_2$/air and drier conditions.

DETAILED DESCRIPTION OF THE INVENTION

Figure 1A:
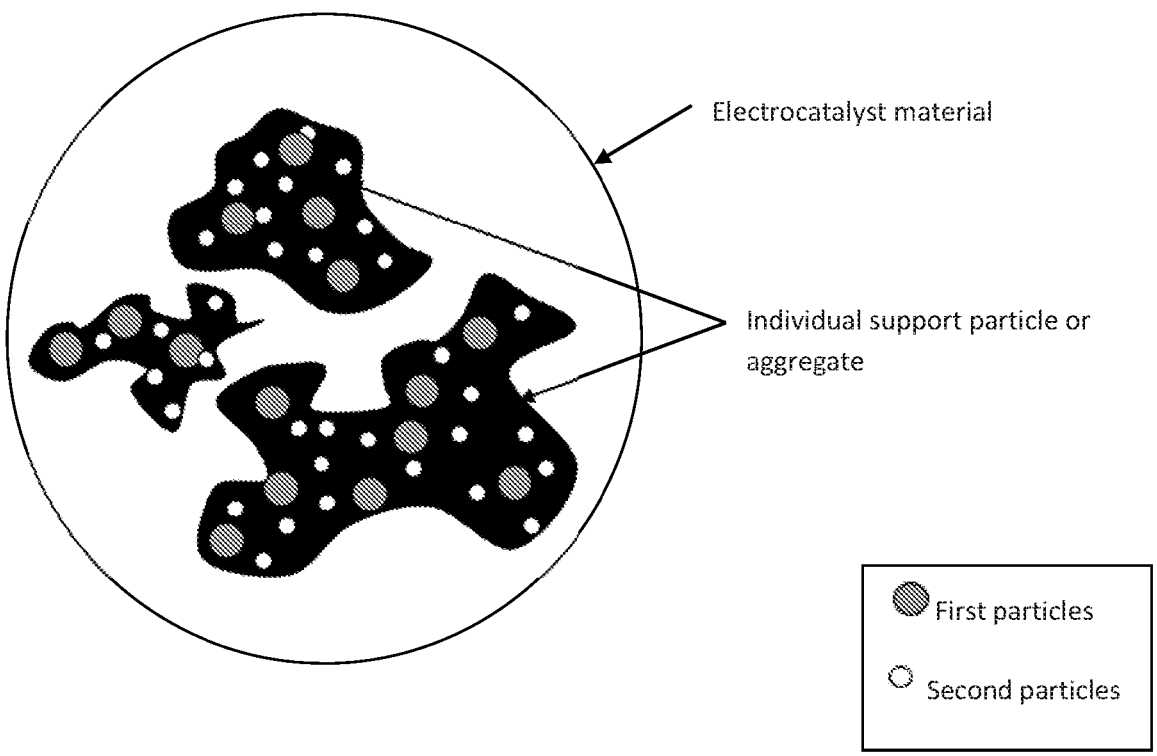
FIG. 1A is a schematic diagram of the electrocatalyst material of the invention.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

Support Material

The support material comprises a plurality of individual support particles or aggregates. By the phrase 'individual support particle or aggregate', is meant the smallest single moiety which is unable to be broken down into two or more smaller moieties. The term 'aggregate' is used to refer to primary particles that have associated into a cluster composed of two or more primary particles, and which are permanently bound to each other; the total specific surface area of the aggregate is less than the sum of the surface areas of the primary particles before they were aggregated. Two or more individual support particles or aggregates can combine to provide an agglomerate. Agglomerates comprise loosely held individual support particles or aggregates held together by weak forces and can be readily broken down into the individual support particles or aggregates under imposition of low energy agitation.

The individual support particles or aggregates suitably have a mean particle or aggregate size between 5 nm and 500 nm and the agglomerates into which they can associate have a surface area of greater than 20 $m^2/g$ when measured by the BET nitrogen sorption method.

The support material may be carbon, for example, a commercially available carbon black (such as available form Cabot Corp. (Vulcan XC72R) and Akzo Nobel (Ketjen black series)) or a graphitised version of these carbon blacks or other commercially available carbon blacks such as acetylene blacks (e.g. those available from Denka). The carbon may also be one specifically designed for use in a fuel cell, such as those described in WO2013/045894. Alternatively, the support material may be a metal oxide (e.g. titania, zirconia, silica or a mixed oxide, in particular a conductive mixed oxide such as niobia-doped titania, phosphorus-doped tin oxide and mixed platinum group metal oxides or mixed metal oxides as disclosed in WO2012/080726), a carbide (e.g. tungsten carbide, molybdenum carbide or titanium carbide, suitably tungsten carbide or titanium carbide), a nitride, in particular a conductive nitride (e.g. titanium nitride or titanium aluminium nitride).

First Particles

The first particles comprise a first metal and an alloying metal.

The first metal is a platinum group metal (platinum, palladium, iridium, osmium, ruthenium or rhodium).

Suitably, the first metal is platinum, palladium or iridium; more suitably, platinum or palladium; preferably platinum.

Suitably, the alloying metal is one or more selected from the group consisting of nickel, cobalt, chromium, copper, aluminium, yttrium, scandium, gadolinium, lanthanum, iron, zinc, titanium, niobium or tantalum.

More suitably, the alloying metal is one or more selected from the group consisting of nickel, cobalt, chromium, copper, aluminium, yttrium, scandium, lanthanum, iron, zinc, titanium, niobium or tantalum.

Preferably, the alloying metal is one or more selected from the group consisting of nickel, cobalt or chromium.

Alternatively, the alloying metal is one or more selected from the group consisting titanium, niobium or tantalum.

Suitably, the atomic ratio of first metal to alloying metal is from 3:1 to 1:3.

Suitably, the first particles have a mean average particle size in the range of from 2 to 14 nm, preferably from 3 to 9 nm.

The mean average particle size is determined by examination in the transmission electron microscope (TEM) and directly measuring the metal particles sizes. Typically, one to two hundred particles are measured in this way.

While the first particles are essentially present as the alloy of the two metals, there may be some surface oxidation on the particles.

Second Particles

The second particles consist of a second metal or second metal oxide, wherein the second metal is platinum or iridium.

In one embodiment, the electrocatalyst material comprises second particles consisting of platinum.

In a further embodiment, the electrocatalyst material comprises second particles consisting of iridium or iridium oxide.

In a yet further embodiment, the electrocatalyst material comprises second particles consisting of platinum and second particles consisting of iridium or iridium oxide, i.e. particles consisting of platinum and particles consisting of iridium or iridium oxide are both present on the same individual support particle or aggregate.

The second particles have a smaller mean average particle size compared to the first particles and suitably have a mean average particle size in the range of from 0.5 to 10 nm, preferably from 1 to 6 nm. The mean average particle size is determined using the method as hereinbefore described.

Where the second particles are essentially present as the metal, there may be some surface oxidation on the particles.

Electrocatalyst Material

The electrocatalyst material comprises the support material wherein each individual support particle or aggregate of the support material has dispersed thereon both first particles and second particles. Suitably, all first particles and second particles are in direct contact with the individual support particle of aggregate of the support material. FIG. 1A shows a schematic diagram showing both first particles and second particles being supported on each individual support particle or aggregate of the support material.

The total platinum group metal loading in the electrocatalyst material is suitably from 20 to 70 wt % and preferably from 30 to 60 wt % based on the total weight of the electrocatalyst material.

Suitably, 20 to 80%, and preferably 40 to 60%, by weight, of the total platinum group metal content is contained in the first particles (i.e. the weight ratio of platinum group metal in the first particles:second particles is from 1:4 to 4:1, preferably from 2:3 to 3:2).

The invention further provides a process for the preparation of the electrocatalyst material of the invention. The process comprises the steps of (i) depositing a first metal onto the support material to form a first precursor;

(ii) depositing an alloying metal onto the first precursor to form a second precursor;

(iii) annealing the second precursor to alloy the first metal and the alloying metal to form a third precursor comprising the support material and the first particles;

(iv) depositing a second metal or second metal oxide onto the third precursor to form the electrocatalyst material.

Steps (i) to (iii) are conventional processing steps known to those skilled in the art for preparing a noble metal/non-noble metal alloy catalyst on a support material. Further details are provided in e.g. WO2013/045894 and WO2014/184546.

Step (iv) may be carried out by a number of processes depending on the second metal to be deposited. For example, the second metal may be deposited using pre-formed metal or metal oxide nanoparticles suspended in solution, for example using a process analogous to that described in WO2005/123255 where a colloidal solution of platinum group metal oxide is contacted with the supported alloy material, followed by a reduction step. The use of pre-formed particles avoids any requirement for a subsequent high temperature heat treatment step and therefore means that these particles will not interact with the alloy first particles formed with the first metal and the alloying metal.

Optionally, an additional step may be performed after step (iii) and before step (iv), in which the third precursor is subjected to an acid wash to remove any excess/unalloyed alloying metal. Examples of acid washing are well known to those skilled in the art. For example, the third precursor may be treated with 0.5M sulphuric acid for up to 24 hours. In addition, or alternatively, this optional step removes (leaches) a portion of the alloying metal from the surface of the alloy to leave the surface of the nanoparticles rich in the first metal (a so-called 'de-alloyed' particle).

In the case where second particles of platinum and second particles of iridium or iridium oxide are both present on the support material, the second particles consisting of one of either platinum or iridium are first deposited on the support material, followed by deposition of the second particles consisting of the other of platinum or iridium or iridium oxide. Thus, the process includes an optional step (v): depositing a second metal or second metal oxide different to that deposited in step (iv) onto the third precursor to form the electrocatalyst material.

The invention further provides an electrocatalyst material obtainable by the process according to the invention.

Figure 1B:
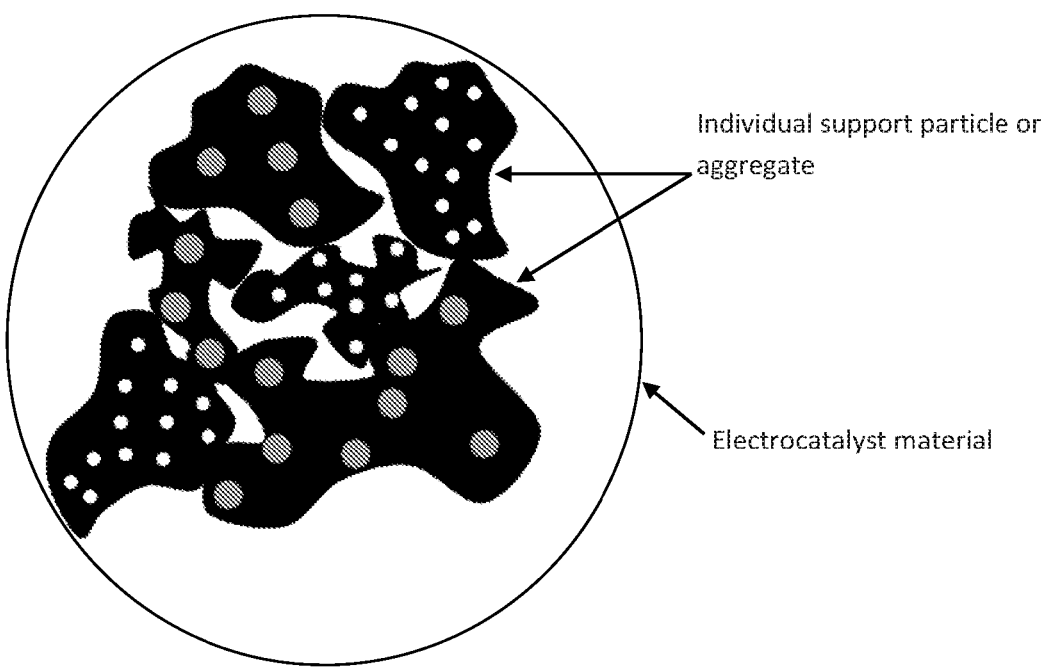
FIG. 1B is a schematic diagram of a prior art electrocatalyst

The electrocatalyst materials of the invention have first particles and second particles located on a single individual support particle or aggregate of the support material and thus the first particles and second particles are in close proximity to each other. Surprisingly, the present inventors have discovered that such a configuration, in contrast to that described in WO2014/105407 and shown schematically in FIG. 1B, provides an improved performance benefit for a membrane electrode assembly (MEA) incorporating such electrocatalyst material at the cathode, such benefit seen particularly when the MEA is operating at high current densities.

Thus, the catalysts of the invention have particular use in a catalyst layer and in particular a cathode catalyst layer, for example for use in a gas diffusion electrode of an electrochemical cell, such as a fuel cell, in particular a PEMFC, or in a catalyst coated ion-conducting membrane of a PEMFC. Thus, there is further provided a catalyst layer comprising the electrocatalyst material of the invention. Furthermore, there is provided the use of the electrocatalyst material of the invention at the cathode or anode, suitably the cathode, of a fuel cell.

The catalyst layer may comprise additional components. Such components include, but are not limited to: an ion-conducting polymer, such as a proton conducting polymer, included to improve the ionic conductivity within the layer; an oxygen evolution catalyst; a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components is within the capability of the skilled person to determine.

To prepare the catalyst layer, the electrocatalyst material of the invention and any additional components are dispersed in an aqueous and/or organic solvent to prepare a catalyst ink. If required, agglomerate particle break-up is carried out by methods known in the art, such as high shear mixing, milling, ball milling, passing through a microfluidiser etc. or a combination thereof, to achieve a suitable particle size distribution of the electrocatalyst.

After preparation of the catalyst ink, the ink is deposited onto a substrate (e.g. gas diffusion layer, ion-conducting membrane or a carrier/transfer substrate) to form the catalyst layer. The ink may be deposited by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

The characteristics of the catalyst layer, such as the thickness, electrocatalyst loading, porosity, pore size distribution, average pore size and hydrophobicity will depend on the use.

For use at the cathode, the thickness of the catalyst layer is suitably ≥2 µm; preferably ≥5 µm; and suitably ≤20 µm; more suitably ≤15 µm.

For use at the cathode, the total loading of the first metal and second metal (in the units following referred to as 'metal') in the catalyst layer is from 0.05 mg metal/cm$^2$ to 0.4 mg metal/cm$^2$, suitably 0.05 mg metal/cm$^2$ to 0.2 mg metal/cm$^2$ and preferably 0.05 mg metal/cm$^2$ to 0.15 mg metal/cm$^2$. It should be noted that the loading of the alloying metal is not included in this catalyst layer loading determination.

The catalyst layer may be deposited onto a gas diffusion layer to form a gas diffusion electrode, suitably a cathode. Thus, a further aspect of the invention provides a gas diffusion electrode comprising a gas diffusion layer and a catalyst layer of the invention. The gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from AvCarb Material Solutions), or woven carbon cloths. The carbon paper, web or cloth may be provided with a pre-treatment prior to fabrication of the electrode and being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

Alternatively, the catalyst layer is deposited onto an ion-conducting membrane, either by direct coating of a catalyst ink onto the membrane, or indirectly by transfer from a carrier or transfer substrate, to form a catalyst coated ion-conducting membrane. Thus, a further aspect of the invention provides a catalyst coated ion-conducting membrane comprising an ion-conducting membrane and a catalyst layer of the invention. The ion-conducting membrane may be any membrane suitable for use in a PEMFC, for example the membrane may be based on a perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.). Alternatively, the membrane may be based on a sulphonated hydrocarbon membrane such as those available from FuMA-Tech GmbH as the Fumapem® P, E or K series of products, JSR Corporation, Toyobo Corporation, and others. Alternatively, the membrane may be based on polybenzimidazole doped with phosphoric acid which will operate in the range 120° C. to 180° C.

The ion-conducting membrane component may comprise one or more materials that confer mechanical strength to the ion-conducting membrane component. For example, the ion-conducting membrane component may contain a porous reinforcing material, such as an expanded PTFE material or a nanofibre network.

The ion-conducting membrane may comprise one or more hydrogen peroxide decomposition catalysts either as a layer on one or both faces of the membrane or embedded within the membrane. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The ion-conducting membrane component may optionally comprise a recombination catalyst, in particular a catalyst for the recombination of unreacted $H_2$ and $O_2$, which gases can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

Alternatively, the catalyst layer is deposited onto a carrier/transfer substrate, by direct coating of a catalyst ink onto the carrier/transfer substrate, to form a catalysed carrier/transfer substrate. Thus, an alternative aspect of the invention provides a catalysed carrier/transfer substrate comprising a carrier/transfer substrate and a catalyst layer of the invention. The carrier/transfer substrate is intended to be removed from the layer in a subsequent step. For example, the catalyst layer may be transferred, by decal transfer, to a gas diffusion layer or ion-conducting membrane, the carrier/transfer substrate being removed immediately after, or at some point subsequent to, the transfer process.

Additional layers may be deposited on the exposed face of the catalyst layer prior to removal of the carrier/transfer substrate; for example, an ion-conducting ionomer layer may be applied from a dispersion of ionomer using any suitable deposition technique known as described above in relation to deposition of the catalyst layer. Further additional layers can be added as required, for example as described in UK Patent Application No. 1405210.4. The carrier/transfer substrate is removed from the catalyst layer at an appropriate time. The carrier/transfer substrate may be formed from any suitable material from which the catalyst layer can be removed without damage thereto. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

The invention further provides an MEA comprising a catalyst layer, a gas diffusion electrode or a catalyst coated ion-conducting membrane of the invention and an electrochemical device, such as a fuel cell, comprising a MEA, catalyst layer, gas diffusion electrode or catalysed membrane of the invention. In particular, the invention provides a MEA comprising a cathode catalyst layer comprising: an electrocatalyst material of the invention; a proton exchange membrane; and an anode catalyst layer, wherein the proton exchange membrane is sandwiched between the cathode catalyst layer and the anode catalyst layer. The anode catalyst layer may be any catalyst layer (conventional or otherwise) known to be of use at the anode.

Although the electrocatalyst materials of the invention are described primarily for use at the cathode of a fuel cell, certain of the catalyst compositions may also have utility at the anode, for example (i) where the first particles comprise platinum alloyed with titanium or niobium and the second particles consist of iridium or iridium oxide or (ii) where the first particles comprise iridium alloyed with tantalum and the second particles consist of platinum. Thus, the invention further provides a MEA comprising: an anode catalyst layer comprising an electrocatalyst material of the invention wherein the first particles comprise platinum alloyed with titanium or niobium and the second particles consist of iridium or iridium oxide or where the first particles comprise iridium alloyed with tantalum and the second particles consist of platinum; a proton exchange membrane; and a cathode catalyst layer, wherein the proton exchange membrane is sandwiched between the anode catalyst layer and the cathode catalyst layer. The cathode catalyst layer may be any catalyst layer (conventional or otherwise) know to be of use at the cathode.

Although the invention is described with reference to its use in a PEMFC, it can be understood that the electrocatalyst material of the invention will have application in other types of fuel cells where the properties of the inventive electrocatalyst material can lead to improved fuel cell performance and/or stability. In addition, the electrocatalyst material of the invention may find application in other electrochemical devices, and in particular in water electrolysis cells where the oxygen evolution reaction is the primary reaction at the anode. In addition, the electrocatalyst material of the invention may find application in non-electrochemical devices.

The invention will be further described with reference to the following examples which are illustrative and not limiting of the invention.

Example 1: (PtNi Alloy+Pt)/C

Preparation of 20 w % Pt PtNi/C

Figure 2A:
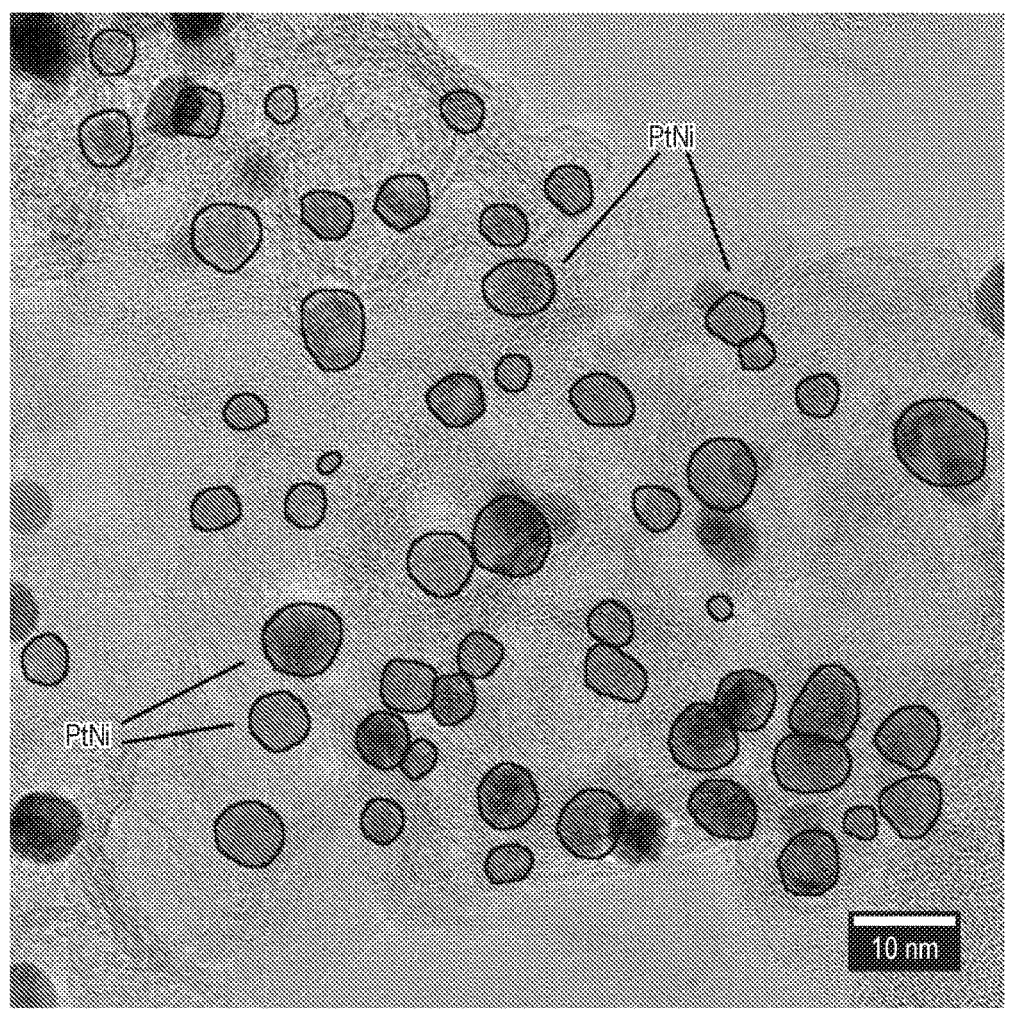
FIGS. 2A and 2B are transmission electron micrograph (TEM) images and particle size distribution graphs for Example 1.
Figure 2A:
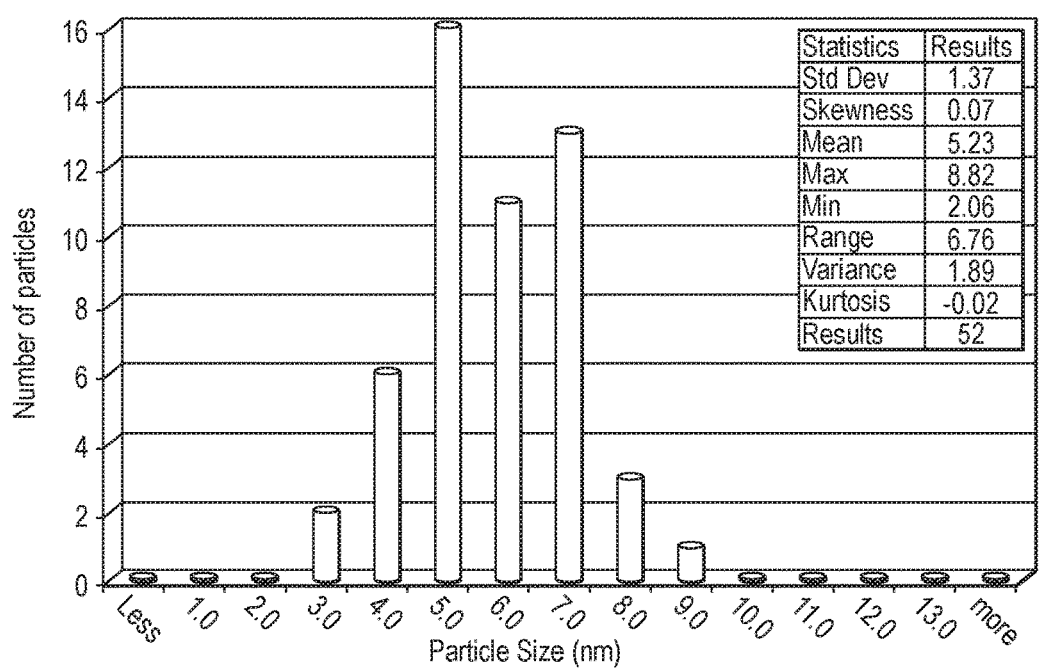

A particulate carbon black supported nanoparticle platinum (Pt/C) catalyst material precursor was prepared using a method analogous to the general method of preparation of carbon supported platinum catalysts described in WO2013/045894. A solution of nickel nitrate (10.66 g; 3.43 g, 0.0585 mol Ni) in water was added (3 ml g$^{-1}$ C) in aliquots to the dried Pt/C catalyst (19.0 g; 3.8 g, 0.0195 mol Pt) and mixed to ensure a homogeneous dispersion. Once deposition was complete the PtNi/C material was recovered, dried and annealed in a reducing atmosphere of 5% H$_2$/N$_2$ at 1000° C. for one hour to alloy the platinum and nickel. The alloyed PtNi/C material was then washed in aqueous and subsequently alcoholic H$_2$SO$_4$ solution (20 ml g$^{-1}$ material) to leach out at least a portion of the Ni; both washing steps were carried out at 80° C. for 24 hours. FIG. 2A shows a transmission electron micrograph (TEM) image of the PtNi/C material prepared and the particle size distribution of the PtNi particles (the first particles).

Figure 2B:
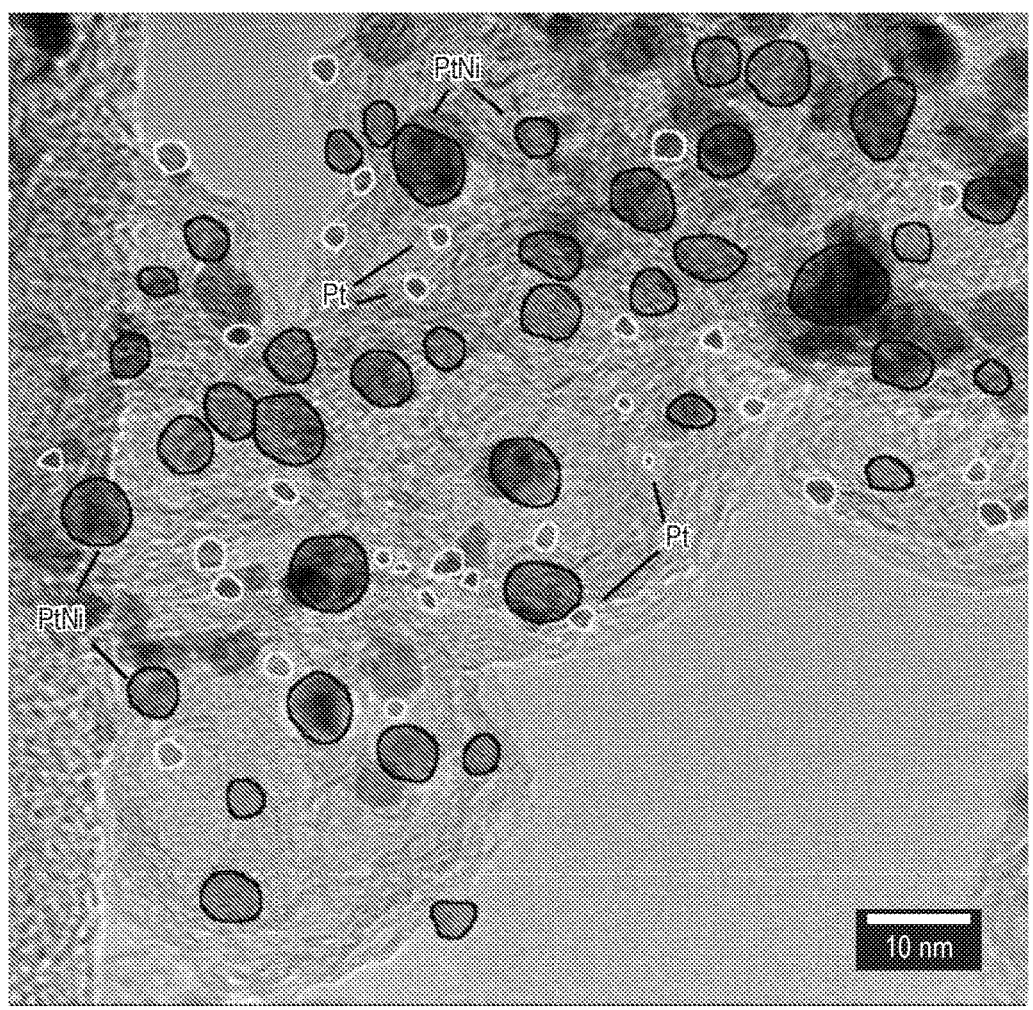
Figure 2B:
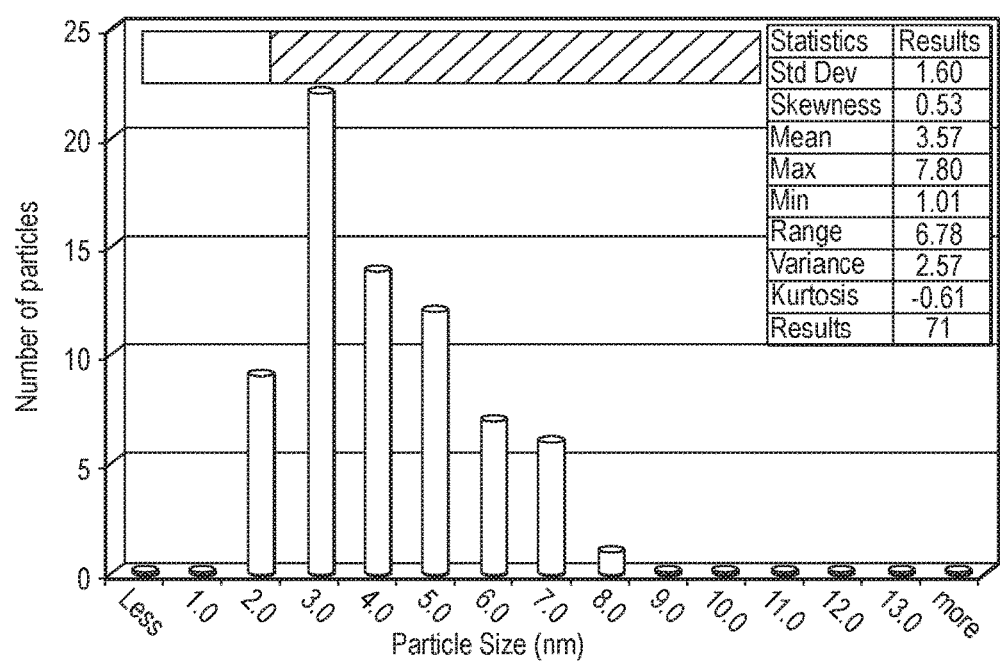

Addition of Pt 19.0 g of the acid leached PtNi/C material prepared above was slurried in 1000 ml water and a tetraethylammonium hydroxide (1.50 g, 0.0101 mol) stabilised dispersion of Pt hydroxide (2.75 g, 0.0141 mole Pt) in 400 ml water, prepared using a method analogous to that described in WO/2005/123255, was added. The mixture was heated to 60° C. and a 1% formaldehyde solution (28 ml g$^{-1}$ Pt added in this step) added before the temperature was raised to 80° C. for 10 minutes to reduce the added Pt. The (PtNi+Pt)/C material was recovered and dried. FIG. 2B shows a TEM image of the (PtNi+Pt)/C material prepared and the cumulative particle size distribution of the PtNi (first particles) and Pt (second particles). On comparison with FIG. 2A it can be clearly seen that there has been a large increase in the proportion of 2-3 nm particles on the carbon support due to the addition of the smaller Pt-only second particles.

An ink comprising Example 1 was prepared by mixing 0.8 g catalyst powder, at high shear rate (i.e. 3000 rpm), with 3.5 g of Nafion® 1100 EW ionomer suspension (11.90 wt % solids) reaching a carbon to ionomer ratio of 80%. Five stabilised zirconia beads were added to the ink and the ink was mixed for 10 minutes until a d$_{50}$ value of between 3 and 5 µm and a d$_{90}$ value of between 15 and 20 µm was achieved.

Comparative Example 1: PtNi/C

A 30 w % Pt PtNi/C sample was prepared following a similar procedure to that described above for Example 1.
Pt/C catalyst (200.0 g; 58.08 g, 0.2977 mol Pt)
Nickel nitrate (162.79 g; 52.42 g, 0.8931 mol Ni)
An ink comprising Comparative Example 1 was prepared using a method similar to that for Example 1.

Comparative Example 2: PtNi/C+Pt/C

A 40 w % Pt PtNi/C sample was prepared following a similar procedure to that described above for Example 1
Pt/C catalyst (20.0 g; 8.00 g, 0.0410 mol Pt)
Nickel nitrate (22.42 g; 7.22 g, 0.1230 mol Ni)
A 20 w % Pt/C sample was prepared following a similar procedure to the Pt addition described above for Example 1 and detailed in WO/2005/123255. The carbon (20 g) was slurried in water and a tetraethylammonium hydroxide (2.73 g, 0.0186 mol) stabilised dispersion of Pt hydroxide (5.00 g, 0.0256 mol Pt) in water, added. The mixture was heated to 60° C. and a 1% formaldehyde solution (28 ml g$^{-1}$ Pt) added before the temperature was raised to 80° C. for 10 minutes to reduce the added Pt. The Pt/C material was recovered and dried.

An ink comprising mixing both Comparative Example 2 catalysts was prepared using a method similar to that for Example 1, with the ratio of PtNi/C:Pt/C being 1:1 of total catalyst weight (i.e. the weight of each catalyst including the carbon support).

A summary of the catalysts prepared is given in Table 1:

TABLE 1

| Catalyst | Metal Assay/% | | Metal area/ (m$^2$gPt$^{-1}$) |
| --- | --- | --- | --- |
| | Pt | Ni | |
| Example 1 | 28.2 | 3.4 | 59.0 |
| Comparative Example 1 | 29.1 | 6.7 | 50.2 |
| Comparative Example 2 | 29.6 | 5.3 | 54.7 |

MEA Fabrication Catalyst coated ion-conducting membranes (CCMs) of 50 cm$^2$ active area were prepared by depositing anode and cathode catalyst layers onto a PTFE sheet and transferring the appropriate layers to either side of a PFSA reinforced membrane (20 µm thickness) at a temperature of between 150° C. to 200° C. The Example 1 of the invention and Comparative Examples were used to form the cathode catalyst layer (the cathode catalyst loading is provided in Table 2); the anode catalyst layer in each CCM comprised a commercially available anode catalyst (HiSPEC® 9100 with a nominal Pt loading of 60 wt % Pt on the carbon support) at a loading of 0.1 mgPt/cm$^2$.

A summary of the CCMs produced is provided in Table 2.

A gas diffusion layer was applied to each face of each CCM to form the complete MEA. The gas diffusion layer used was a carbon fibre paper with a hydrophobic microporous layer containing carbon and PTFE applied to the face in contact with the CCM.

Catalyst Mass Activity Measurement

The catalyst kinetic mass activity was measured on the 50 cm$^2$ MEAs with pure hydrogen and oxygen as the anode and cathode reactants respectively at 80° C. under fully humidified and pressurised anode and cathode (100% RH, 50 kPa$_{gauge}$) conditions. The catalyst mass activity, shown in Table 2, was calculated by measuring the resistance-corrected (iR-corrected) current at 0.9 V and normalised by the mass of platinum in the cathode catalyst layer.

MEA Performance Testing

The polarisation (current vs voltage) performances of the 50 cm$^2$ MEAs were measured in H$_2$/air at 80° C. under fully humidified and pressurised cathode (100% RH, 100 kPa$_{gauge}$) and reduced humidification cathode (30% RH, 50 kPa$_{gauge}$) conditions. In all measurements, the cell humidity (RH) and pressure was controlled at the anode and cathode inlets. The cell voltage performance at 1.6 A/cm$^2$ (fully humidified conditions) and 1.0 A/cm$^2$ (reduced RH conditions) are summarised in Table 2 and shown in FIG. 3 and FIG. 4 respectively.

TABLE 2

| | Cathode catalyst | Cathode catalyst loading (mgPt/cm$^2$) | Voltage @1.6 A/cm$^2$ 100% RH H$_2$/Air (V) | Voltage @1.0 A/cm$^2$ 30% RH H$_2$/Air (V) |
|---|---|---|---|---|
| CCM 1 | Example 1 | 0.10 | 0.569 | 0.447 |
| Comparative CCM 1 | Comparative Example 1 | 0.10 | 0.503 | <0.3 |
| Comparative CCM 2 | Comparative Example 2 | 0.17 | 0.476 | <0.3 |

The benefit of the catalyst of the invention is particularly seen in the MEA performance testing on H$_2$/air, particularly at high current density under humidified (100% RH) and reduced RH conditions (30% RH). Table 2 shows that the performance under H$_2$/air for CCM 1 is higher than Comparative CCM 1, which had undergone the same acid treatments, showing the beneficial effect is not due to the effect of these treatments on the catalyst support. The performance under these conditions is also higher than Comparative CCM 2 where a mixed catalyst powder was used. The Example of the invention thus demonstrates higher performance with a lower Pt loading (and therefore lower cost). It is worth noting that the performance benefits are especially high at lower humidity, i.e. 30% RH, when compared to the Comparative CCMs.

The invention claimed is:

1. An electrocatalyst material comprising:
   (i) a support material comprising a plurality of individual support particles or aggregates;
   (ii) first particles comprising a first metal and an alloying metal; and
   (iii) second particles consisting of a second metal or a second metal oxide, wherein the second metal is platinum or iridium;
   wherein each individual support particle or aggregate has dispersed thereon first particles and second particles,
   wherein the mean average particle size of the second particles is smaller than the mean average particle size of the first particles.

2. The electrocatalyst material according to claim 1, wherein the first metal is a platinum group metal.

3. The electrocatalyst material according to claim 2, wherein the first metal is platinum.

4. The electrocatalyst material according to claim 1, wherein the alloying metal is one or more selected from the group consisting of nickel, cobalt, chromium, copper, aluminium, yttrium, scandium, gadolinium, lanthanum, iron, zinc, titanium, niobium or tantalum.

5. The electrocatalyst according to claim 1, wherein the ratio of first metal to alloying metal is from 3:1 to 1:3.

6. The electrocatalyst material according to claim 1, wherein the first particles have a mean average particle size in the range of from 2 to 14 nm.

7. The electrocatalyst material according to claim 1, wherein the electrocatalyst material comprises second particles consisting of platinum.

8. The electrocatalyst material according to claim 1, wherein the electrocatalyst material comprises second particles consisting of iridium or iridium oxide.

9. The electrocatalyst material according to claim 1, wherein the electrocatalyst material comprises second particles consisting of platinum and second particles consisting of iridium or iridium oxide.

10. The electrocatalyst material according to claim 1, wherein the second particles have a mean average particle size in the range of from 0.5 to 10 nm.

11. The electrocatalyst material according to claim 1, wherein the total loading of platinum group metal in the electrocatalyst material is from 20 to 70 wt % based on the total weight of the electrocatalyst material.

12. The electrocatalyst material according to claim 1, wherein 20 to 80% of the platinum group metal in the electrocatalyst material is contained in the first particles.

13. A process for the preparation of an electrocatalyst according to claim 1, said process comprising the steps of:
   (i) depositing a first metal onto the support material to form a first precursor;
   (ii) depositing an alloying metal onto the first precursor to form a second precursor;
   (iii) annealing the second precursor to alloy the first metal and the alloying metal to form a third precursor comprising the support material and the first particles;
   (iv) depositing a second metal or a second metal oxide onto the third precursor to form the electrocatalyst material.

14. The process according to claim 13, wherein step (iv) comprises depositing the second metal using pre-formed metal or metal oxide nanoparticles suspended in solution.

15. The process according to claim 13, comprising an additional step after step (iii) and before step (iv), in which the third precursor is subjected to an acid wash.

16. The process according to claim 13, comprising an additional step (v) comprising depositing a second metal or second metal oxide different to that deposited in step (iv) onto the third precursor.

17. A catalyst layer comprising an electrocatalyst material according to claim 1.

18. The catalyst layer according to claim 17, wherein the catalyst layer is a cathode catalyst layer.

19. A gas diffusion electrode comprising a gas diffusion layer and a catalyst layer according to claim 17.

20. A catalyst coated ion-conducting membrane comprising an ion-conducting membrane and a catalyst layer according to claim 17.

\* \* \* \* \*